United States Patent [19]
Olsen et al.

[11] Patent Number: 5,008,929
[45] Date of Patent: Apr. 16, 1991

[54] BILLING SYSTEM FOR TELEPHONE SIGNALING NETWORK

[75] Inventors: Steven A. Olsen, Tumwater; William J. Cronin; Ben L. Jarvis, both of Lacey; Jeff G. McMillan, Olympia, all of Wash.

[73] Assignee: U.S. Intelco Networks, Inc., Olympia, Wash.

[21] Appl. No.: 467,054

[22] Filed: Jan. 18, 1990

[51] Int. Cl.$^5$ .................. H04M 1/66; H04M 15/04
[52] U.S. Cl. ............................ 379/112; 379/115
[58] Field of Search ............... 379/112, 115, 113, 114, 379/120, 134, 135

[56] References Cited

U.S. PATENT DOCUMENTS 4,756,020 7/1988 Fodale .................................. 379/112

Primary Examiner—Stafford D. Schreyer
Attorney, Agent, or Firm—Christensen, O'Connor, Johnson & Kindness

[57] ABSTRACT

A billing system for use in a telephone signaling network. The network comprising offices through which telephone calls can be routed, each office being owned by a telephone company that participates in the network. Each office includes a signaling point (SP) that includes means for formulating message signaling units (MSUs). An MSU may comprise a query requesting a call data pertinent to a particular call, for example, for verifying the validity of a credit card number. The network also includes signal transfer points (STPs) for receiving and routing the MSUs, and plurality of service control points (SCPs), each SCP being linked to one of the STPs. Each SCP comprises a database that includes call data provided by one or more of the participating telephone companies. The billing system of the invention includes means for capturing at least a portion of the MSUs received by one or more STPs. The billing system processes the MSUs to produce usage data that indicates service recipients and service providers. The service recipient is the telephone company that owns the SP that formulated the MSU, and the service provider is the telephone company that provided the call data for the MSU, or that transported the MSU. The usage data may then be used to produce invoice data for accurately assigning costs among the telephone companies.

19 Claims, 8 Drawing Sheets

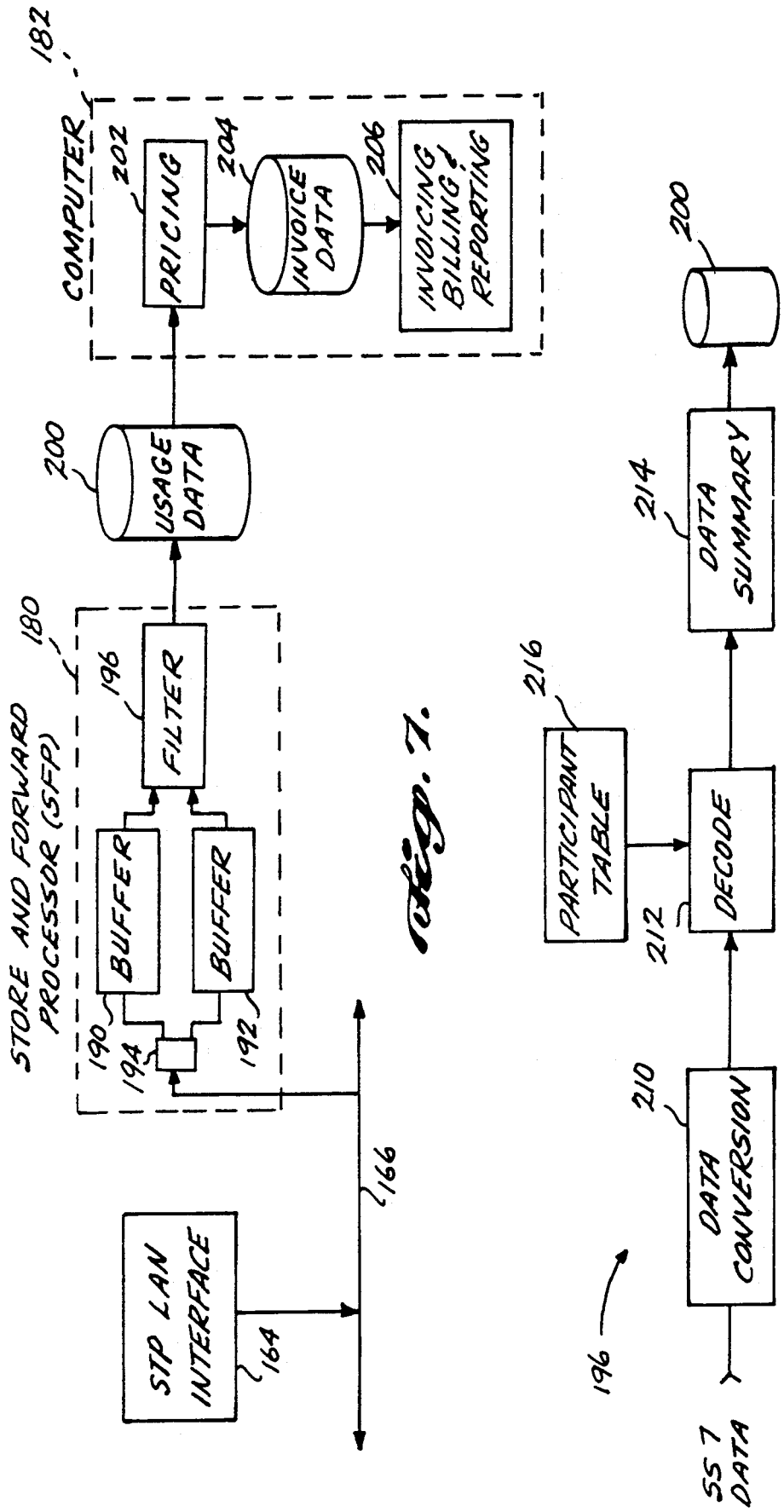

| | Decoded Fields |
|---|---|
| 230 | Recipient of Service (MSU Initiator) |
| 232 | Provider of SCP Accessed |
| 234 | Provider of STP Accessed |
| 236 | Provider of Data Accessed |
| 238 | Transaction Type |
| 240 | Time of Day |

Fig. 11.

BILLING SYSTEM FOR TELEPHONE SIGNALING NETWORK

FIELD OF THE INVENTION

The present invention relates to data networks, and more particularly to a billing system for a signaling network that is overlaid onto a telephone system.

BACKGROUND OF THE INVENTION

Modern telephone systems provide a number of mechanisms for the indirect or alternate billing of a given telephone call. For example, a calling party may request that a call be charged to a particular telephone credit card number, to a third party, or to the called party (i.e., a collect call). To avoid fraud, such alternate billing services are preferably subjected to a validation procedure before the call is allowed to proceed.

The first large scale system adopted for validating credit card calls utilizes a nationwide collection of databases containing the required validation information. To participate, a given telephone company places its validation data in one of such databases, so that it will be available to all telephone companies through which a call may be initiated. Unfortunately, as further described below, this system does not permit the telephone company that provided the validation data to bill the companies that use or transport the data.

The U.S. telephone systems are constantly undergoing modernization, and are presently being upgraded by the addition of digital common channel signaling networks to the existing voice network. In the resulting composite network, validation data will be stored in a plurality of distributed databases, each distributed database being maintained by a particular telephone company or, more commonly, by a group of telephone companies such as in a Regional Bell Operating Company. In the new system, each distributed database can determine the number of validation requests received, broken down by the initiators of the requests. Further, this system will also be used to transport call setup information between the switching nodes of the existing telephone network. However the system being deployed is not presently equipped with the capability of billing based upon the actual use of validation data accessed in any of the distributed databases, or for the transport of call setup information. There therefore exists an unmet need for an improved tracking system for information transfers which will provide for an accurate assignment of costs based on such services.

SUMMARY OF THE INVENTION

The present invention provides a billing system for use in a telephone signaling network.

The telephone network is assumed to comprise a plurality of offices through which telephone calls can be routed, each office being owned by a telephone company that participates in the network. Each office includes a signaling point (SP) that includes means for formulating a message signaling unit (MSU). An MSU may comprise a query for requesting call data pertinent to a particular call, or a message for setting up a call. The call data can comprise validation data for verifying the validity of a credit card number. The telephone network also includes a plurality of signal transfer points (STPs) for receiving and routing the MSUs. Each SP and STP comprises a node, and the network also includes digital data links connecting the nodes to one another. A plurality of service control points (SCPs) are also included in the network, each SCP being linked to one of the STPs. Each SCP comprises a database that includes call data provided by one or more of the participating telephone companies.

The particular improvement to which the present invention is directed comprises a billing system connected to at least one STP. The billing system includes means for capturing at least a portion of the MSUs received by the STP, and for processing the MSUs to produce usage data indicating a service recipient and a service provider. The service recipient is the telephone company that owns the SP that formulated the MSU. The service provider may be the telephone company that provided the call data for the MSU, or that transported the MSU. In the former case, the usage data may also indicate an SCP provider, the SCP provider being the telephone company that owns the SCP containing the call data. The usage data may be used to produce invoice data for accurately assigning costs among the telephone companies, as well as for producing reports relating to system usage.

BRIEF DESCRIPTION OF THE DRAWINGS

FIG. 7 is a block diagram of the billing system;

FIG. 8 is a block diagram of the data filter;

FIG. 11 is a list of the data fields produced by the decode module; and

DETAILED DESCRIPTION OF THE INVENTION

Figure 1:
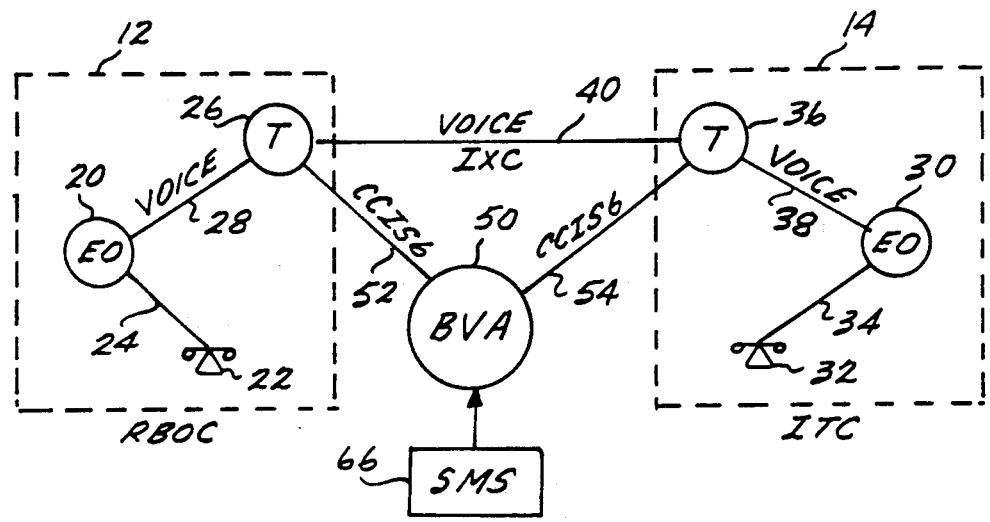
FIG. 1 is a schematic diagram of a conventional telephone network.

FIG. 1 presents a simplified illustration of a system currently in use in the United States telephone system for call validation and related functions. FIG. 1 includes a Regional Bell Operating Company (RBOC) 12, and an independent telephone company (ITC) 14. RBOC 12 includes end office (EO) 20, subscriber 22 connected to end office 20 by line 24, and tandem office (T) 26 connected to end office 20 by voice grade trunk 28. A tandem office is a switching point that functions to transfer calls between end offices, or between an end office and another tandem office. Thus tandem offices primarily switch and connect trunks rather than individual subscriber lines. ITC 14 similarly includes end office 30, subscriber 32, line 34, tandem office 36, and voice grade trunk 38.

Tandem offices 26 and 36 are interconnected with one another by voice grade link 40 provided by an interexchange carrier (IXC). Link 40 is used, for example, to enable subscriber 22 in RBOC 12 to place a long distance call to subscriber 32 in ITC 14.

In the system shown in FIG. 1, call validation and related functions are handled by billing, validation and administration system (BVA) 50. BVA 50 is essentially a computer, owned and operated by AT&T. Tandem offices 26 and 36 are linked to BVA 50 by links 52 and 54, respectively. These links utilize a protocol known as CCIS6. CCIS6 is an example of common channel signaling, i.e., a system that provides one path for voice, and a separate path for control signals, such as the control signals used to set up a call. Maintenance and update of the data stored in BVA 50 is handled by service management system (SMS) 66.

In the system shown in FIG. 1, a credit card validation transaction operates as follows. Assume that subscriber 22 wishes to call subscriber 32, using a credit card number. Subscriber 22 dials 0, followed by the area code and number of subscriber 32. This information goes to end office 20, and is forwarded to tandem office 26 via voice grade trunk 28. Tandem office 26 then prompts end office 20 for the credit card number. This number is entered by the subscriber, and forwarded to tandem office 26, also via trunk 28. Upon receiving the credit card number, tandem office 26 launches an inquiry to BVA 50. If the credit card number is valid, a corresponding message is returned from BVA 50 to tandem office 26. At that time, the tandem office would complete the call via IXC link 40. Voice call data would be recorded by tandem office 26, using its automated message accounting (AMA) system. Using this system, the tandem office will record the calling and called numbers, the time of day, the date and the duration of the call, for subsequent billing of the call. However, in the illustrated system, there is no way to charge for actual use of a particular credit card number stored in the BVA database.

Figure 2:
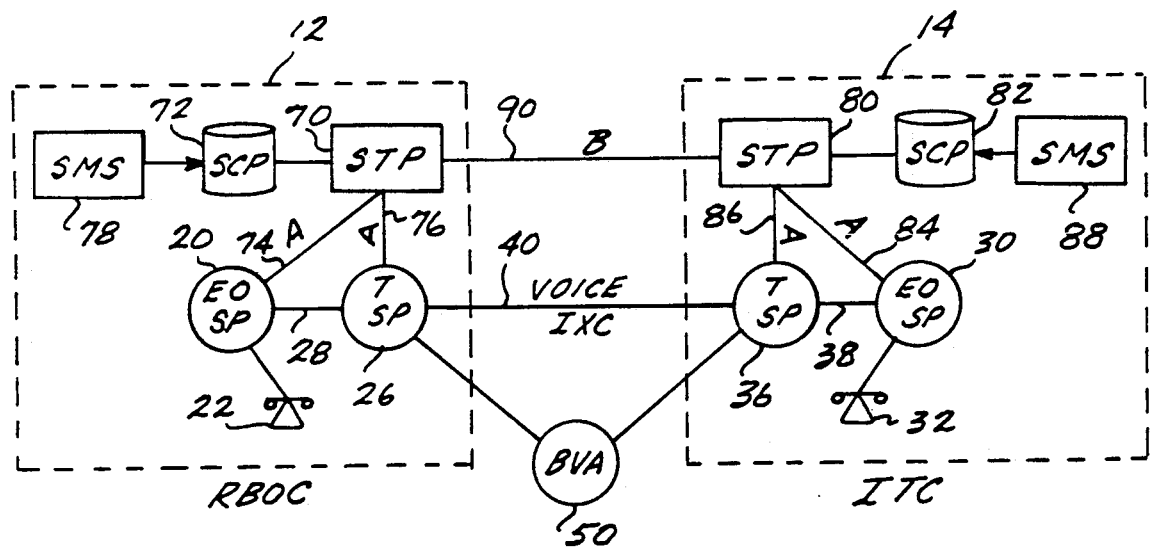
FIG. 2 is a schematic diagram of the network of FIG. 1, modified to provide common channel signaling.

In recent years, there has been a move to modify the telephone network by providing a new common channel signaling system referred to as SS7. FIG. 2 sets forth an example of the components shown in FIG. 1, upgraded to include SS7 common channel signaling. For example, in FIG. 2, it has been assumed that end offices 20 and 30 and tandem offices 26 and 36 have been upgraded so that they include SS7 signaling capabilities. In the terminology used in the SS7 system, these offices are referred to as having SP (signaling point) capability, as indicated in FIG. 2.

Within RBOC 12, the upgraded system also includes signal transfer point (STP) 70 and service control point (SCP) 72. Within ITC 14, the upgraded system includes signal transfer point (STP) 80 and service control point (SCP) 82. Each STP is essentially a specialized packet switch for receiving and transmitting digital data using packet switch technology. Each SCP is essentially a computer and an associated database, as further described below. The database in SCP 72 is maintained by a service management system (SMS) 78, while the database in SCP 82 is maintained by SMS 88. End office 20 is coupled to STP 70 via digital A link 74. In an SS7 system, an A link is a link between an SSP and an STP. End office 30 is similarly coupled to STP 80 via A link 84. Tandem offices 26 and 36 are linked to STPs 70 and 80, respectively, via A links 76 and 86, respectively. STPs 70 and 80 are interconnected by B link 90. In the SS7 system, a B link is a link between a pair of STPs, and typically includes a data transfer rate of 56 kbps.

Assume now that subscriber 22 wishes to place a call to subscriber 32. Subscriber 22 dials 1+the area code and number of subscriber 32. This information is received by end office 20. However, instead of seizing voice trunk 28, end office 20 transmits a message signaling unit (MSU) containing the call setup information to STP 70 via link 74. For initial call setup, the MSU is referred to as an initial address message (IAM), the call setup information being contained in the ISDN-UP portion of the MSU. STP 70 transmits the received MSU to STP 80 via link 90, and the MSU is then transmitted to tandem office 26. Tandem office 26 reserves a voice circuit between itself and end office 20, and then sends a new IAM to STP 70, which in turn relays the IAM to STP 80. STP 80 forwards the IAM to tandem office 36. Upon receipt of the IAM, tandem office 36 reserves a voice circuit between itself and tandem office 26, and sends a new IAM to STP 80. STP 80 then relays the IAM to end office 30. Upon receipt of this IAM, end office 30 will check the status of subscriber 32, and if free, will complete the voice circuit path between itself and tandem office 36, apply ringing to subscriber 32, and send a new MSU which is relayed back to end office 20 by the following path: STP 80; tandem office 36; STP 80; STP 70; tandem office 26; STP 70; end office 20. This message notifies end office 20 that a voice path has been established through the network, and that it should apply ring back tone to subscriber 22. When subscriber 32 answers, end office 30 discontinues ringing, and sends back another MSU (ANS) via the aforementioned path, which will notify each end and tandem office along the path to complete the connection. This MSU also causes end office 20 to discontinue ring back tone. Subscribers 22 and 32 can now engage in conversation. An important advantage of the composite system shown in FIG. 2 is that the amount of time the voice circuits are used for call setup is greatly reduced, to about 1-2 seconds, as opposed to in excess of 10 seconds with the existing network.

Imagine now that subscriber 22 wishes to place a call to subscriber 32, using a credit card number. The fact that this is to be a credit card transaction is detected by end office 20, and the end office prompts subscriber 22 for the credit card number. The credit card number is then forwarded to STP 70. STP 70 determines whether the pertinent credit card information is stored in SCP 72, or in a remote SCP. Assuming the former, STP 70 sends an MSU to SCP 72, to determine whether the credit card number is valid. This type of MSU is referred to as a query. If the credit card number is valid, then the call would be set up via link 90 as described above. However, if STP 70 determines that the appropriate credit card data is stored in a remote SCP, then STP 70 launches a query MSU to the appropriate STP. For example, if STP 80 is the appropriate STP, then STP 70 will launch an MSU to STP 80 via link 90. When this MSU is received by STP 80, it transmits the MSU to SCP 82. Information as to whether the credit card number is valid is then returned from SCP 82 to EO 20 via the reverse path, in the form of an MSU referred to as a response. In all of the above examples, the call is ultimately routed through tandem offices 26 and 36, and the actual billing is handled by the tandem offices as described for the system shown in FIG. 1. Note that, in FIG. 2, tandem offices 26 and 36 are still coupled to BVA 50. These links are utilized for the purposes of accomplishing a smooth transition from the prior system shown in FIG. 1 to the full digital overlay system in which credit card validation information is stored in the SCPs.

In the system shown in FIG. 2, each SCP makes a record of each MSU made to it, and the resulting data, i.e., list of MSUs, is then used for billing and revenue allocation purposes. The information recorded by the SCP comprises the SP that originated the MSU and the nature of the MSU, e.g., credit card validation, trunk signaling (IAM, ANS, etc.) third party billing, etc. Thus billing for call validation services can be based upon MSUs made to the SCP database.

It should be understood that the arrangement shown in FIG. 2 is but one example of the way in which independent telephone companies are connected to the remainder of the telephone network. For example, a small ITC might simply contain an end office, which would then typically be connected to a tandem office in a nearby RBOC. If the ITC includes a tandem office, then that tandem office may be linked to a tandem office in the nearest RBOC.

Figure 3:
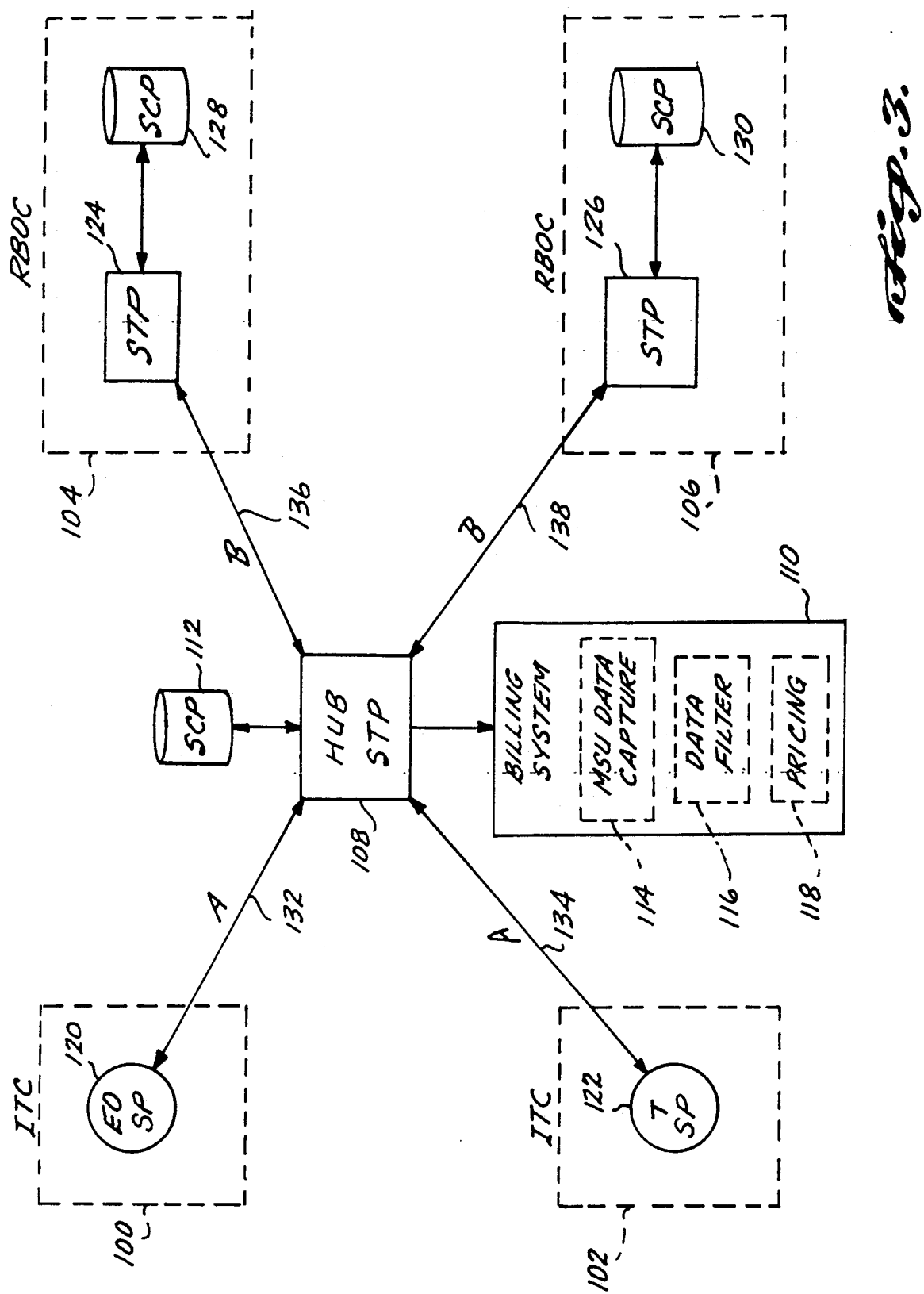
FIG. 3 illustrates the billing system of the present invention coupled to a hub STP.

One preferred embodiment of the present invention is illustrated by the telephone network shown in FIG. 3. The network includes ITCs 100 and 102, RBOCs 104 and 106, hub STP 108, billing system 110 and SCP 112. The principal components of billing system 110 are MSU data capture system 114, data filter 116, and pricing system 118. The underlying voice network has been omitted from FIG. 3, to simplify the illustration. ITC 100 includes end office 120 that includes SP capability, and ITC 102 includes a tandem office 122 that also includes SP capability. RBOCs 104 and 106 include respective STPs 124 and 126, and SCPs 128 and 130. End office 120 and tandem office 122 are linked to STP 108 by A links 132 and 134, respectively. STPs 124 and 126 are linked to STP 108 via B links 136 and 138, respectively. In the network shown in FIG. 3, STP 108 is referred to as a "hub" STP, because of its central position in the network architecture. Other embodiments of the invention, in which the billing system is coupled to one or more non-hub STPs, are described below.

A primary function of hub STP 108 is to route SS7 messages from one SP to another, e.g., between end office 120 and STP 124, or between STP 124 and STP 126. In the terminology of the SS7 protocol, such messages are termed message signaling units, or MSUs. MSUs include queries, responses to queries, and trunk signaling messages. By way of example, an MSU might be a message requesting information as to whether a credit card number was valid. A response would be the requested validation information. A trunk signaling message could be a message used to set up a voice circuit in the existing network. These and other MSU types are discussed in greater detail below. Each time that an MSU is received by STP 108, a copy of the MSU is also received by billing system 110. The received MSU data is processed by the billing system to produce invoices, bills and reports, as further described below.

To illustrate the operation of the network shown in FIG. 3, imagine that a subscriber resides in RBOC 104, and has a telephone credit card issued by that RBOC. The validation information for the credit card is therefore stored in SCP 128. If that subscriber wished to make a credit card call from within the region served by ITC 100, end office 120 would compose an MSU requesting information as to whether the credit card number was valid, and transmit the query in an MSU over the illustrated digital network to STP 124 via STP 108.

STP 124 transmits the MSU to SCP 128, and the MSU containing the response is then routed back to end office 120 over the same path in the reverse direction. When the MSU from end office 120 is received by STP 108, a copy of the MSU is also received by billing system 110. The response MSU may also be copied and received by the billing system. The billing system uses this information to produce invoice data that indicates the recipient of the service, i.e., the MSU initiator, and the provider of the data accessed in SCP 128. The billing data may also include the provider of SCP 128 itself, and the provider of STP 108. Such billing data may then be used to bill ITC 100 for the hubbing service provided by STP 108, for the use of SCP 128, and for the use of the particular data record accessed. The important point is that because billing system 110 receives a copy of the MSU, it is capable of determining not simply that a charge is owed to RBOC 104, but can associate the charge with the individual telephone company within RBOC 104 that provided the queried data record. This system is to be contrasted with the system shown in FIG. 2, wherein each SCP simply records the MSUs made to it.

The principal function of SCP 112 is to serve as a centralized database for independent telephone companies. Thus, for example, credit card validation information for the customers of ITCs 100 and 102 can be stored in SCP 112. When a subscriber to ITC 100 wishes to place a credit card call from RBOC 106, STP 126 formulates the MSU, and sends it to STP 108. STP 108 makes a copy of the MSU, and then directs it to SCP 112. Thus STP 108 and SCP 112 perform the functions of an STP and an SCP for subscribers to the independent telephone companies.

Figure 4:
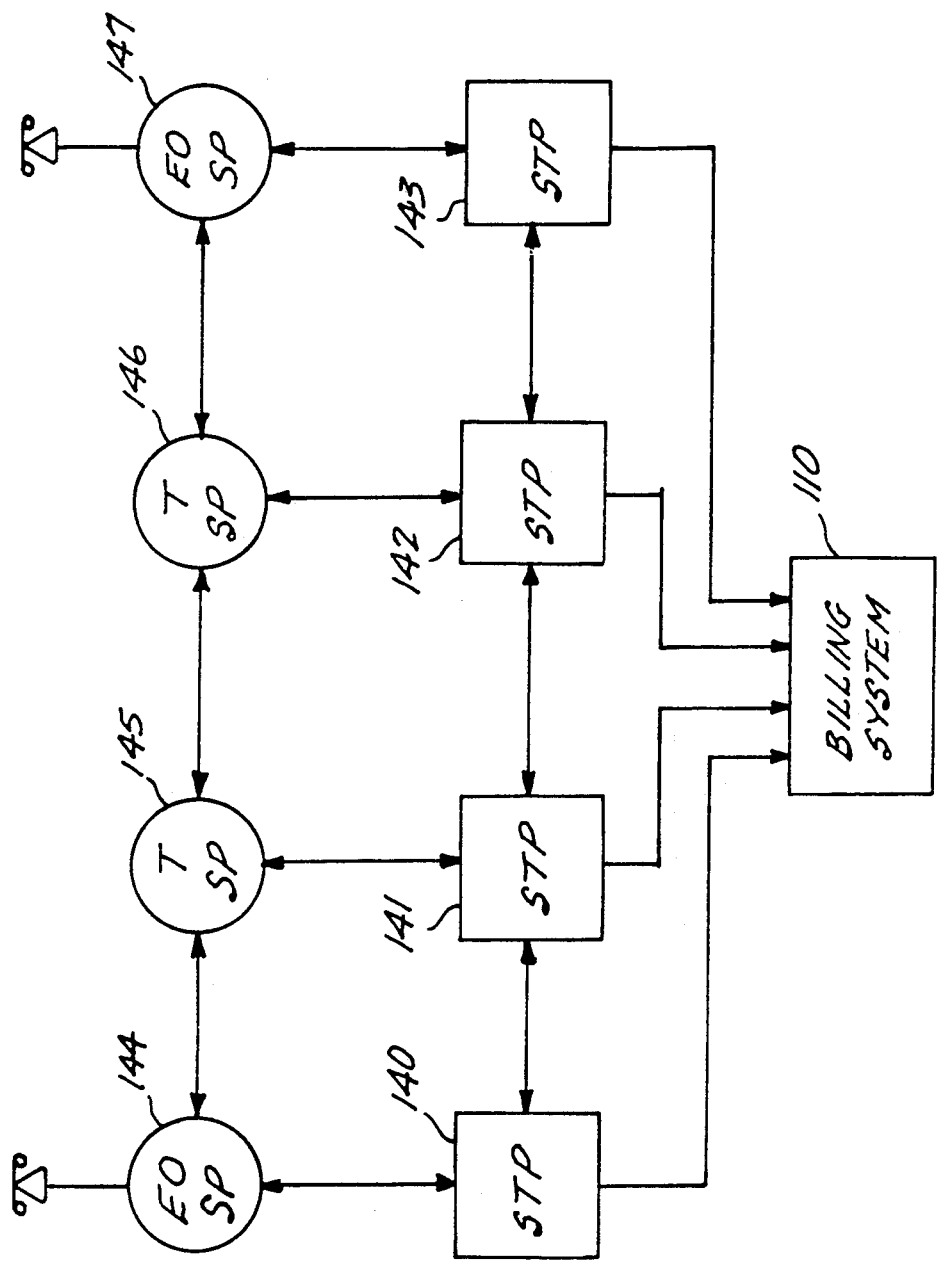
FIG. 4 illustrates the billing system of the present invention coupled to multiple STPs.

FIG. 4 illustrates the use of the present invention in a telephone network that does not include a hub STP. The illustrated telephone network includes STPs 140-143, linked to respective SP equipped offices 144-147, respectively. The message flows are as previously described in conjunction with FIG. 2. In this arrangement, no single STP serves the function of a hub. Billing system 110 is therefore preferably separately coupled to each STP, to ensure that the data collection process will be as comprehensive as possible.

Figure 5:
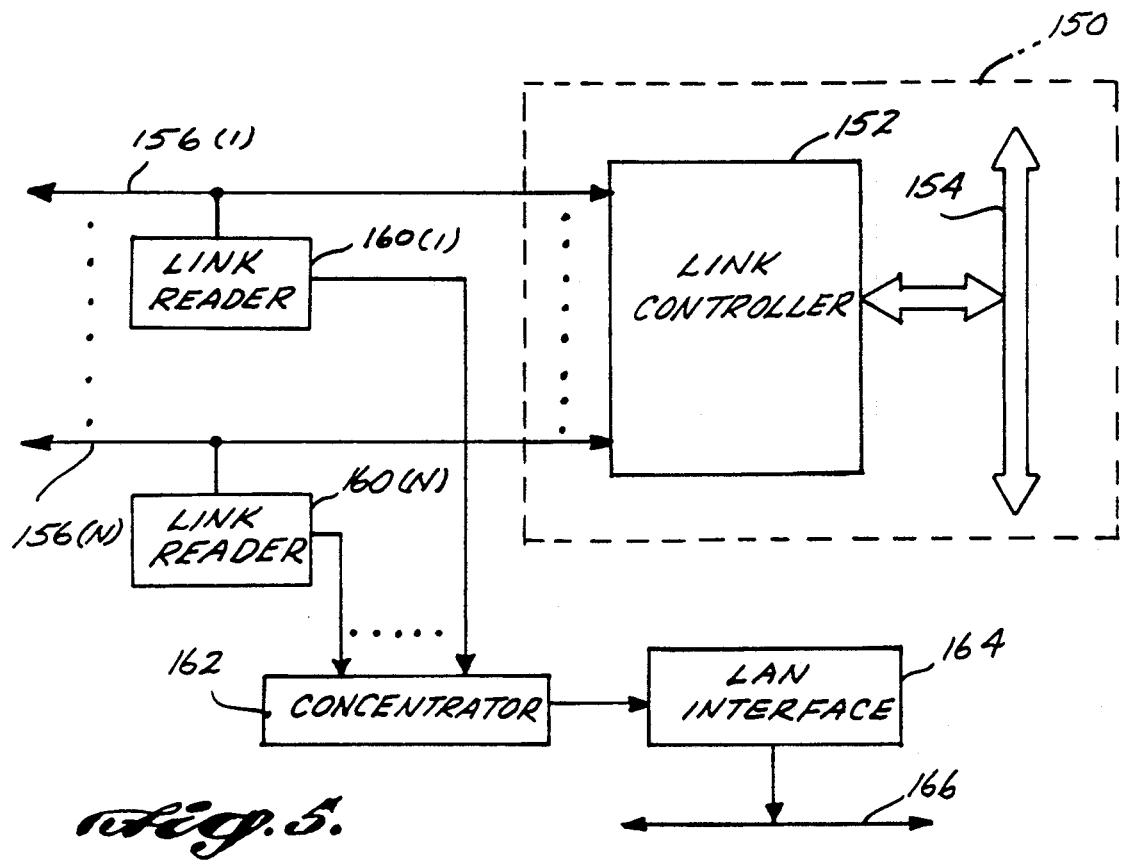
FIG. 5 illustrates the capture of MSUs external to an STP.
Figure 6:
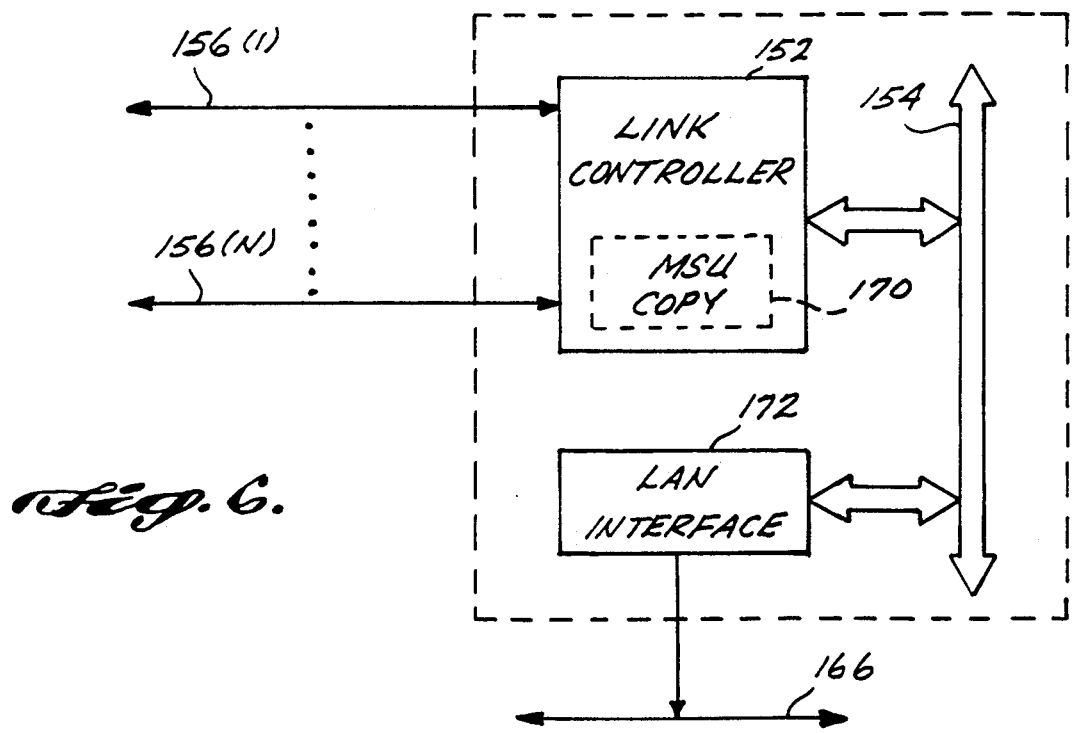
FIG. 6 illustrates the capture of MSUs within an STP.

FIGS. 5 and 6 illustrate two techniques for capturing MSUs received by an STP. In FIG. 5, the MSUs are captured external to the STP, while FIG. 6 illustrates a preferred internal capture technique. Referring initially to FIG. 5, STP 150 comprises a plurality of link controllers 152, only one of which is illustrated in FIG. 5. Each link controller is coupled to STP bus 154, and provides the interface at the STP for a plurality of data links 156(1)-156(N). In the external copy embodiment, a plurality of link readers 160(1)-160(N) are coupled to the respective links 156, to copy each incoming MSU. The copied MSUs are sent to concentrator 162 that multiplexes the MSUs received from the individual links, and outputs such MSUs to LAN interface 164. LAN interface 164 in turn couples the copied MSUs to bus 166, for use by the billing system. A suitable bus is an Ethernet bus conforming to the IEEE 802.3 protocol, or any other data communication means that can handle the anticipated volume of traffic.

In the internal copy option illustrated in FIG. 6, link controller 152, and the other link controllers in the STP, include an MSU copy facility 170 that makes a copy of each incoming MSU on links 156(1)-156(N), and transmits the copied MSUs to LAN interface 172 via STP bus 154. LAN interface 172 then outputs the copied MSUs to bus 166, as in the external option shown in FIG. 5.

A preferred embodiment of billing system 110 is illustrated in FIG. 7. The billing system comprises store and forward processor (SFP) 180 and computer 182. SFP 180 is coupled to one or more STP LAN interfaces 164 via bus 166, as described above. The SFP comprises a pair of buffers 190 and 192 that are coupled to bus 166 via interface 194. Data in buffers 190 and 192 are output from the store and forward processor via filter 196 into usage data file 200. The functions performed by filter 196 are described below. Buffers 190 and 192 are used in alternating fashion, such that while one buffer is receiving data from bus 166, the other buffer is being processed by filter 196, for output to the usage data file. The store and forward processor preferably comprises a general purpose data processor or computer, in which case buffers 190 and 192 may simply comprise data files maintained by the data processor. The store and forward processor essentially converts the variable rate data stream produced by the STPs into batch billing data suitable for further processing. Usage data file 200 may be thought of as a part of SFP 180 or of computer 182, or may comprise a transportable media, such as a tape or disk cartridge, that is physically transported between the SFP and the computer.

Computer 182 comprises pricing module 202 that analyzes usage data 200 for the purpose of assigning prices to the pricing elements indicated in the usage data. The output of pricing module 202 is invoice data 204 that may then be used to produce invoices from and to the various telephone companies participating in the telephone network. The invoices may be produced by an invoicing, billing and reporting module 206. While the store and forward processor is preferably located at the same site as the STP, computer 182 can be at any convenient location.

A preferred embodiment for filter 196 is shown in FIG. 8. The preferred filter comprises data conversion module 210, decode module 212, data summary module 214, and participant table 216. Each telephone company participating in the network is assigned a unique participant number. Participant table 216 enables decode module 212 to identify the recipient and providers of services for a given MSU, based upon the data provided by data conversion module 210. The output of filter 196 comprises billing data that is accumulated in usage data file 200, and the usage data in file 200 is periodically (e.g., daily) transferred to computer 182.

The MSUs received by filter 196 are in SS7 format, i.e., the data is binary and in a variable record length format. Data conversion module 210 preferably first makes a backup of each MSU or group of MSUs received, and then converts the binary, variable length data of each MSU into a fixed length alphanumeric record in a standard character set such as EBCDIC or ASCII. Data conversion module 210 may also write unconvertible messages to an invalid message file for off-line processing.

Figure 9:
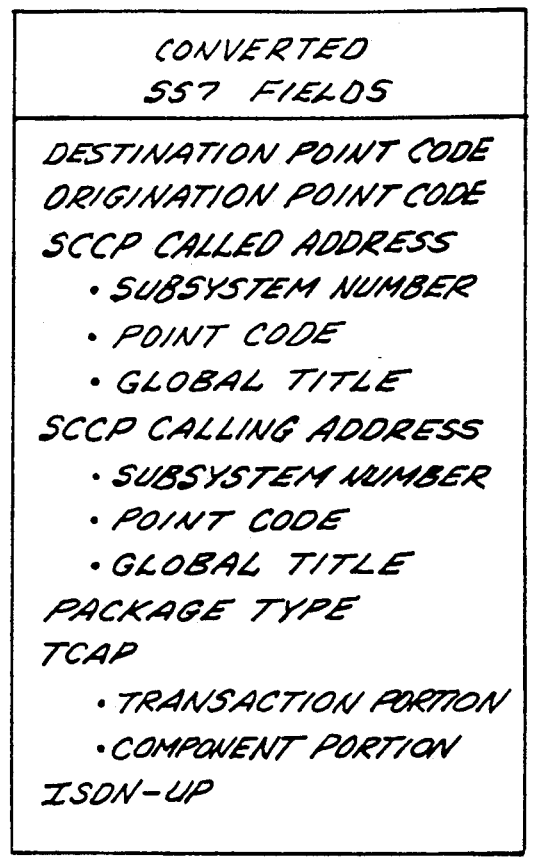
FIG. 9 is a table showing the SS7 fields converted by the data conversion module.

Preferably, data conversion module 210 extracts all MSU data required for pricing and billing all significant aspects of the message. In the preferred embodiment, the converted SS7 fields are those shown in FIG. 9. The format of the raw SS7 messages, and techniques for extracting data therefrom, are well known to those skilled in the art, and will not be repeated here. In general, each SS7 message includes a message transfer part (MTP), a signaling control connection part (SCCP), and either a transaction capabilities application part (TCAP) or an Integrated Services Digital Network-User Part (ISDN-UP). Query and response MSUs include the MTP, SCCP and TCAP, while trunk signaling MSUs include the MTP, SCCP (optional) and the ISDN-UP. In FIG. 9, the destination and origination point codes are extracted from the MTP, the SCCP called and calling addresses are extracted from the SCCP, while the remaining fields are extracted from the TCAP or ISDN-UP, as appropriate.

The destination and origination point codes are each three octets in length, an octet being a string of eight bits. Each of such octets is converted to a three-digit alphanumeric number. FIG. 9 indicates that each SCCP address can include a subsystem number, a global title, and a point code. Each of such fields is converted if present. From the TCAP part of the message, the transaction part indicates whether the message is a query, a response, or a conversation, while the component portion indicates the actual call related information fields. Similarly, the ISDN-UP part of the message contains the number (CIC) of the voice circuit which will be used for a call, while the message type code specifies the type of ISDN-UP message (e.g., IAM, ACM, ANS, etc.). Some MSUs are not pertinent to call setup or database access (e.g., network management messages), since these messages are not required for billing purposes. In addition, a particular implementation of the billing system may capture only queries, only trunk signaling messages, or any other subset of the MSUs that may be needed for a particular application. The output produced by data conversion module 210 preferably includes a time of day indicator. Such an indicator is located on the header record for each group of SS7 messages.

The list of fields in FIG. 9 does not intend to reflect any specific service, as the actual field will vary depending upon whether a message is transaction (TCAP) or circuit (ISDN-UP) related. While one MSU will not contain both a TCAP and an ISDN-UP portion, the actual use of the MSU is service dependent. Current SS7-based services include calling card validation (CCV), billed number screening (BNS), advanced 800, and trunk signaling. The first three of these are achieved through the use of MSUs containing TCAP, while the latter MSUs will contain the ISDN-UP. As new services are defined and offered, then such types could also be converted.

Figure 10:
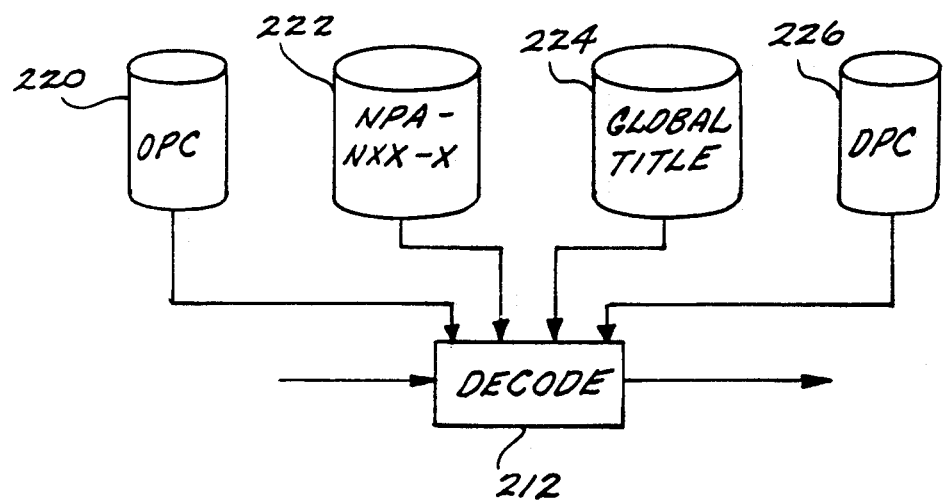
FIG. 10 is a block diagram showing the tables used by the decode module.

The operation of decode module 212 is illustrated in further detail in FIGS. 10 and 11. Referring initially to FIG. 10, decode module 212 makes use of four participant tables: originating point code (OPC) table 220; calling number (NPA-NXX-X) table 222; global title table 224; and destination point code (DPC) table 226. Each of these tables translates the indicated information into the appropriate participant code, a participant being a telephone company participating in the network.

The format of the data produced by decode module 212 is illustrated in FIG. 11. In a preferred embodiment, for each converted record, the decode module produces an output record that comprises service recipient field 230, SCP provider field 232, STP provider field 234, data provider field 236, transaction type field 238 and time of day field 240. Service recipient field 230 indicates the recipient of the network service, i.e., the participant that owns the particular SP node or STP from which the MSU was initiated. To determine the service recipient, decode module 212 uses the calling address point code to look up the participant in OPC table 220. If the calling address point code is not found, then the decode module determines the service recipient using NPA-NXX-X table 222. In the case of TCAP MSUs, if neither the point code nor the calling NPA-NXX-X is found, then the service recipient is determined from global title table 224.

SCP provider field 232 designates the company providing the SCP that will be used to respond to the MSU, i.e., the SCP to which the MSU is directed. This field is determined by searching DPC table 226, using the SCCP called address point code in the converted record. If a message has undergone its final global title translation, then the destination point code is used to determine the SCP provider. In this case, DPC table 226 is searched to obtain the participant. If a message requires global title translation, DPC table 226 is still used, and the company owning the STP or SCP receiving the message is the service provider.

STP provider field 234 designates the company providing the STP through which the billing system received the copy of the MSU. In an implementation as shown in FIG. 3 in which the billing system is coupled to a hub STP, this field will always identify the owner of the hub STP. Otherwise, the STP provider field will identify the particular STP at which the MSU was captured. Additional functionality to determine the data provider is required when the MSU contains TCAP information. If the transaction type is originating line number screening (OLNS), then the data provider is determined by searching NPA-NXX-X table 222 using the calling number in the TCAP portion of the converted input record. If the transaction type is terminating line number screening (TLNS), then the data provider is determined using the NPA-NXX-X table, using the dialed number in the TCAP. Finally, if the transaction type is billed number screening (BNS) or credit card validation (CCV), then the data provider is determined from the NPA-NXX-X table, using the billing number in the TCAP.

For all of the variations described above, the decode module identifies at least one service provider. For query MSUs, the service providers comprise the SCP provider, the STP provider, and/or the data provider. For ISDN-UP MSUs, the service provider will generally be the STP provider.

Referring again to FIG. 8, data summary module 214 receives the decoded records as shown in FIG. 11, and summarizes such records, using the six illustrated fields as a key. Thus in a preferred embodiment, data summary module 214 produces usage data records that include the fields shown in FIG. 11, plus one additional count field indicating the number of decoded records summarized to produce each usage data record. It will be understood by those skilled in the art that the decode and data summary modules could be readily combined, if desired.

Figure 12:
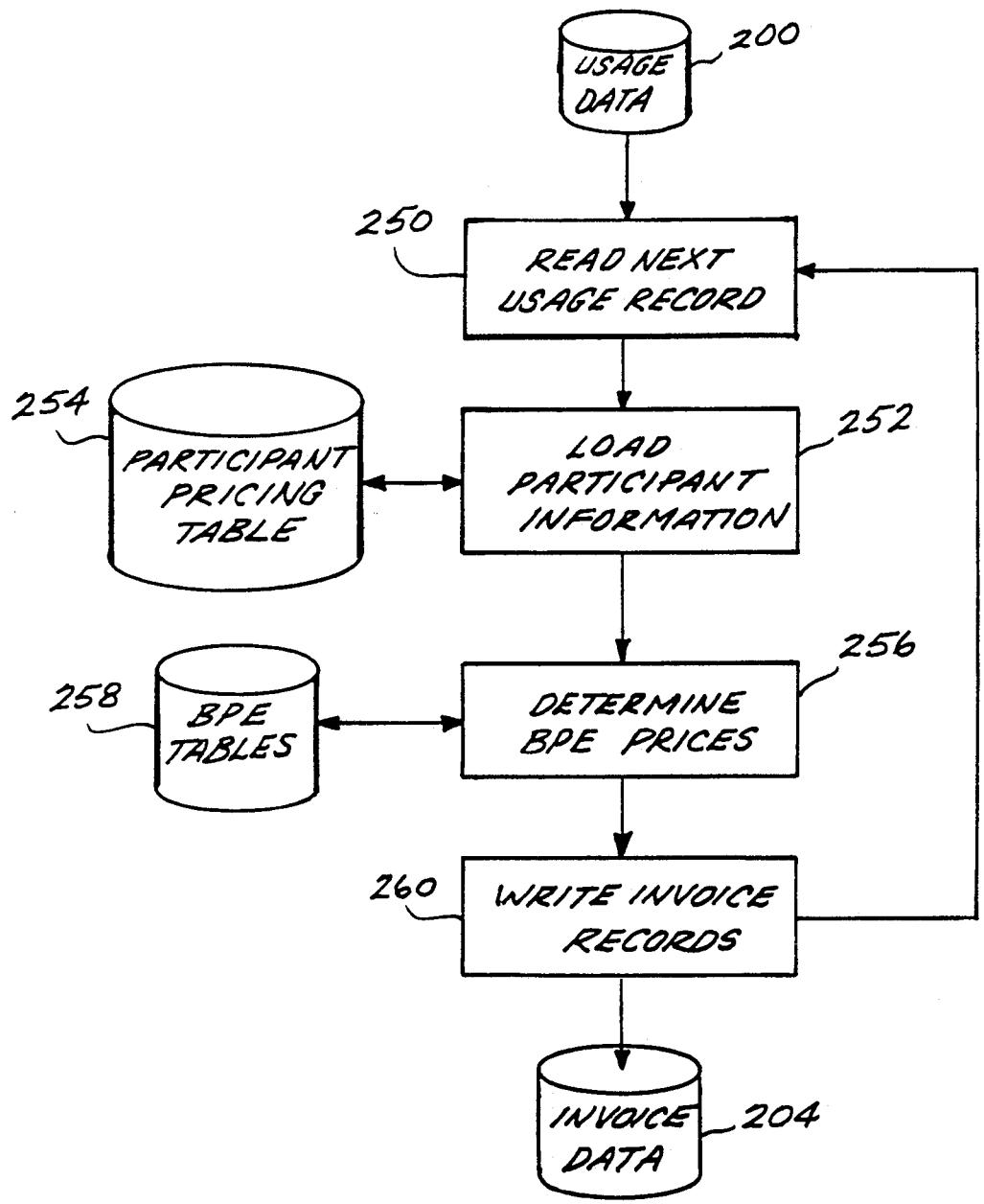
FIG. 12 is a block diagram of the pricing module.

Operation of a preferred embodiment of pricing module 202 is illustrated in FIG. 12. The pricing module commences in block 250 by reading the next usage data record from usage data file 200. Each usage data record includes the fields shown in FIG. 11, plus a total count field. In block 252, the pricing module proceeds to load participant information for each of the participants included in the usage data record. The participants are the service recipient 230, the SCP provider 232, the STP provider 234, and the service provider 236, which may be the STP provider itself in the case of ISDN-UP MSUs. Information concerning each participant is obtained from participant pricing table 254. The participant pricing table indicates how a given participant will be billed when that participant is a service recipient, and the prices charged by each provider for providing different services. The participant pricing table can also indicate billing cycles for each participant, whether a participant requires protocol conversion, and any other information found necessary for pricing the MSU transaction or MSU transport.

Once the participant information has been loaded, the pricing module proceeds in block 256 to determine prices for the basic pricing elements (BPEs) indicated in the usage data record. By way of example, for an MSU transaction directed toward a particular data item in a particular SCP, at least two BPEs will be generated: an SCP access BPE, and a data access BPE. Each of these BPEs will be used to generate a separate invoice data record, as described below. Other BPEs that may be included are a protocol conversion BPE if an MSU requires protocol conversion (e.g., X.25 to CCS7); and one or more STP usage BPEs, depending upon the overall configuration of the network.

Once the BPEs for a given usage data record have been determined, the prices for the BPEs are determined from BPE tables 258. In a preferred embodiment, there is a separate BPE table for each type of BPE. Each BPE table indicates the price for a given BPE transaction, broken down by participant, transaction type and time of day. By way of example, consider an MSU transaction of the type described above, in which participant A (service recipient) directs an MSU to an SCP owned by participant B (the SCP provider), and in particular to a data record stored in the SCP that was provided by participant C (the data provider). For such a transaction, at least two BPEs will be required, one for SCP access, and one for data access.

For SCP access, block 256 will utilize an SCP access BPE table that includes prices for SCP access charged by each participant (or each participant that owns an SCP), optionally broken down by transaction type and time of day. Information as to whether a given SCP provider includes separate transaction type and time of day prices will generally be determined in block 252 based upon the participant pricing table. Thus based on such information, block 256 will build a key and then use that key to determine the price using the SCP provider BPE table. Block 256 will also multiply the price by the number of transactions indicated by the usage data record. These steps will then be repeated for the data access BPE, using a separate data access BPE table.

Once the steps in block 256 have been completed, the pricing module outputs suitable invoice records into invoice data file 204, one record for each BPE. The pricing module then returns to block 250 to repeat the process for the next usage data record.

As indicated in FIG. 7, invoice data file 204 is processed by invoicing, billing and reporting system 206, to produce invoices, bills and reports, as desired by the operator of the billing system. Many suitable invoicing, billing and reporting systems are commercially available, and in any case the selection of a suitable system is well within the ability of those skilled in the art.

While the preferred embodiments of the invention have been illustrated and described, numerous variations within the broad scope of the invention will be apparent to those skilled in the art. For example, some or all of the billing system modules could be migrated inside a particular STP, rather than being performed by external hardware and software. This option will in general be more practical in networks such as the one shown in FIG. 3, in which a single STP acts as a hub. In such an arrangement, the functions performed by store and forward processor 180 and computer 182 would be performed by suitable modules connected directly to the STP bus. However the arrangement shown in FIG. 7, in which the store and forward processor and computer are external to the STP, is preferred given currently available technology.

The embodiments of the invention in which an exclusive property or privilege is claimed are defined as follows:

1. In a telephone network having a plurality of offices through which telephone calls can be routed, each office being owned by a telephone company, each office including a signaling point (SP) that includes means for formulating a message signaling unit (MSU), the network further including a plurality of signal transfer points (STPs) for receiving and routing the MSUs, a plurality of digital data links connecting the SPs and STPs to one another, and a plurality of service control points (SCPs), each SCP being linked to one of the STPs and comprising a database that includes call data provided by one or more telephone companies, the improvement comprising:

a billing system including means for capturing at least a portion of the MSUs received by said one STP and for processing such MSUs to produce usage data indicating service recipients and service providers for the MSUs, the service recipient for an MSU being the telephone company that owns the SP that formulated the MSU, and the service provider for an MSU being the telephone company that provided the call data for the MSU or that transported the MSU.

2. The improvement of claim 1, wherein the MSU comprises a query requesting call data pertinent to the processing of a particular call, and wherein the service provider is the telephone company that provided the call data for the MSU.

3. The improvement of claim 2, wherein the usage data also indicates SCP providers for the MSUs, the SCP provider for an MSU being the telephone company that owns the SCP containing the call data for the MSU.

4. The improvement of claim 1, wherein each MSU captured by the billing system comprises binary data in SS7 format, and wherein the billing system further comprises a data conversion module for converting the binary data of an MSU to fixed record length converted data in a standard character format, and a decode module for receiving the converted data and for producing a decoded data record indicating the service recipient and service provider for the MSU.

5. The improvement of claim 4, wherein the billing system further comprises data summary means for combining a plurality of decoded data records that have the same service recipient and service provider, and for producing a usage data record that includes a record count field indicating the number of decoded data records that were combined.

6. The improvement of claim 1, wherein the billing system is connected to more than one STP, and includes means for capturing at least a portion of each MSU received by each STP.

7. The improvement of claim 1, wherein the billing system comprises a store and forward processor connected to the STP for receiving the captured MSUs, the store and forward processor including filter means for processing the captured MSUs to produce usage data, the usage data indicating the service recipients and the data providers for the MSUs.

8. The improvement of claim 7, wherein the billing system further comprises a computer, the computer including means for receiving the usage data, and pricing means for processing the usage data to produce invoice data, the invoice data including the prices chargeable by the data providers to the service recipients.

9. The improvement of claim 1, wherein the billing system comprises filter means for receiving the captured MSUs and processing the captured MSUs to produce usage data, the usage data indicating the service recipients and the service providers for the MSUs.

10. The improvement of claim 9, wherein the filter comprises data conversion means for receiving the captured MSUs, and converting the captured MSUs into fixed length, alphanumeric converted records.

11. The improvement of claim 10, wherein the filter comprises decode means for receiving the converted records and for producing decoded data records identifying the service recipient and the data provider for each converted record.

12. The improvement of claim 11, wherein the filter further comprises data summary means for combining a plurality of decoded data records having the same service recipient and service provider, and for producing a usage data record identifying the service provider, the service recipient, and the number of decoded data records that were combined.

13. The improvement of claim 9, wherein the billing system further comprises pricing means for receiving the usage data record and producing invoice data, the invoice data including the prices chargeable by the service providers to the service recipients.

14. A method for use in a telephone network having a plurality of offices through which telephone calls can be routed, each office being owned by a telephone company, each office including a signaling point (SP) that includes means for formulating a message signaling unit (MSU), the network further including a plurality of signal transfer points (STPs) for receiving and routing the MSUs, a plurality of digital data links connecting the SPs and STPs to one another, and a plurality of service control points (SCPs), each SCP being linked to one of the STPs and comprising a database that includes call data provided by one or more telephone companies, the improved method comprising:

capturing at least a portion of the MSUs received by at least one STP, and processing such MSUs to produce usage data indicating service recipients and service providers for the MSUs, the service recipient for an MSU being the telephone company that owns the SP that formulated the MSU, and the service provider for an MSU being the telephone company that provided the call data for the MSU or that transported the MSU.

15. The method of claim 14, wherein the MSU comprises a query requesting call data pertinent to the processing of a particular call, and wherein the service provider is the telephone company that provided the call data for the MSU.

16. The improved method of claim 15, wherein the usage data also indicates SCP providers for the MSUs, the SCP provider for an MSU being the telephone company that owns the SCP containing the call data for the MSU.

17. The method of claim 14, wherein each MSU captured by the billing system comprises binary data in SS7 format, and wherein the improved method further comprises converting the binary data of an MSU to fixed record length converted data in a standard character format, and decoding the converted data to produce a decoded data record indicating the service recipient and the service provider of the MSU.

18. The improved method of claim 17, comprising capturing at least a portion of each MSU received by a plurality of STPs.

19. The improvement of claim 14, wherein the captured MSUs are processed to produce usage data indicating the service recipient and the service providers for the MSUs, and wherein the method comprises the further step of processing the usage data to produce invoice data, the invoice data including the prices chargeable by the service providers to the service recipients.

* * * * *